UNITED STATES PATENT OFFICE.

JOHN POLSON AND JOHN MARSHALL HARLEY, OF PAISLEY, COUNTY OF RENFREW, SCOTLAND.

MANUFACTURE OF STARCH.

SPECIFICATION forming part of Letters Patent No. 285,067, dated September 18, 1883.

Application filed August 18, 1883. (No specimens.)

*To all whom it may concern:*

Be it known that we, JOHN POLSON, of the firm of Brown & Polson, of Paisley, in the county of Renfrew, North Britain, corn flour and starch manufacturer, and JOHN MARSHALL HARLEY, of Paisley aforesaid, manager to the said firm, have invented Improvements in the Manufacture of Starch, (for which we are about to apply for Letters Patent in the United Kingdom of Great Britain and Ireland, Republic of France, Empire of Germany, and Dominion of Canada, and in no other country or countries.) The following is a specification of the same.

This invention, which relates to improvements in the manufacture of starch, has reference not only to starch used for ordinary household or manufacturing purposes, but also to starch used or prepared for edible or culinary purposes, such as is generally known as "corn flour" and "prepared corn."

The invention has for its object not only to improve starch, as hereinbefore described, generally, so as to render the same more mellow, and also more free from that peculiar odor and flavor or taste resulting from the process of drying such substances under the influence of artificial heat, but also to render the granulation more complete and the lumps, usually called "crystals," less brittle and larger in size.

The invention by which the foregoing objects are effected consists in taking the starch, after it has been drained of moisture and cut up or divided, and placing it in a stove, wherein it is dried in an atmosphere charged with moisture or steam. The moisture or steam may be introduced either by steam injected into the said stove by perforated pipes, or their equivalent, or by water in the form of spray or otherwise, so as to obtain the requisite degree of moisture in the stove.

In carrying out this invention it is desirable to observe this precaution—namely, that before bringing the starch into contact with the hot moist atmosphere of the stove the starch should be previously warmed, so as to avoid the injurious effect of the moisture of the heated atmosphere condensing upon the cold starch, and this may be effected, for example, by heating up the starch in the stove to the requisite degree before the moisture is applied.

We claim—

The improvement in treating starch, consisting in drying it in a stove whose atmosphere is charged with moisture or steam, as described.

In testimony whereof we have signed our names to this specification in the presence of two subscribing witnesses.

JOHN POLSON.
JOHN MARSHALL HARLEY.

Witnesses:
JOHN MADDER TUDHOPE,
WILLIAM SMITH,
*Both of* 115 *St. Vincent Street, Glasgow.*